United States Patent
Wang

(10) Patent No.: US 8,668,950 B2
(45) Date of Patent: Mar. 11, 2014

(54) COCOA NUGGETS AND METHOD OF MAKING SAME

(75) Inventor: Xiaoying Wang, Hummelstown, PA (US)

(73) Assignee: The Hershey Company, Hershey, PA (US)

( * ) Notice: Subject to any disclaimer, the term of this patent is extended or adjusted under 35 U.S.C. 154(b) by 70 days.

(21) Appl. No.: 13/457,803

(22) Filed: Apr. 27, 2012

(65) Prior Publication Data

US 2012/0276249 A1  Nov. 1, 2012

Related U.S. Application Data

(60) Provisional application No. 61/479,887, filed on Apr. 28, 2011.

(51) Int. Cl.
 *A23G 1/00* (2006.01)
(52) U.S. Cl.
 USPC .......................................... 426/631; 426/660
(58) Field of Classification Search
 USPC .................................................. 426/631, 660
 See application file for complete search history.

(56) References Cited

U.S. PATENT DOCUMENTS

| 4,308,288 A | 12/1981 | Hara et al. |
| 2007/0134400 A1 | 6/2007 | Kealey et al. |
| 2008/0241335 A1 * | 10/2008 | Rey et al. .................... 426/575 |

FOREIGN PATENT DOCUMENTS

| EP | 0885567 A2 | 12/1998 |
| GB | 2270828 A | 3/1994 |
| GB | 2306291 A | 7/1997 |
| GB | 2416106 A | 1/2006 |
| WO | 2010022914 A1 | 3/2010 |

OTHER PUBLICATIONS

Anon. 1999. http://www.recipelink.com./msgbrd/board_2/1999/JUL/4789.html. pp. 1-3.*
London, Anne, editor. 1958. Mary Margaret McBride Encyclopedia of Cooking. Homemakers Research Institute, Evanston, Illinois. p. 657.*
Rombauer, I. S. 1997. Joy of Cooking. A Plume Book. New York. p. 710.*

* cited by examiner

*Primary Examiner* — Carolyn Paden
(74) *Attorney, Agent, or Firm* — McNees, Wallace & Nurick LLC

(57) ABSTRACT

Cocoa nuggets and methods for their manufacture are disclosed. The nuggets are formed by providing a dough including, on a dry basis, at least 30% by weight cocoa powder, the dough having a moisture content of at least 10% to about 52% by weight. The dough is processed into nuggets having a moisture content of not greater than about 15% by weight. The nuggets can be crunchy or chewy and can be used as an ingredient such as an inclusion or a topping for food products in order to increase antioxidant levels and the method of creating the nuggets results in minimal loss of antioxidant capacity as a result of processing.

16 Claims, No Drawings

COCOA NUGGETS AND METHOD OF MAKING SAME

RELATED APPLICATION

This Application claims the benefit of and priority to U.S. Provisional Application No. 61/479,887 filed Apr. 28, 2011, which is hereby incorporated by reference.

FIELD

This application is directed to the manufacture of cocoa-based products and more particularly to the manufacture of nuggets having high levels of cocoa loading.

BACKGROUND

The health benefits of high antioxidant foods have become increasingly appreciated by greater segments of the population. Scientific studies suggest that certain plant compounds that act as antioxidants in foods may reduce the risk of many kinds of illness, from heart disease to cancer.

Cocoa comes from cacao beans (or cocoa beans), which grow on the cacao tree. Cocoa beans are full of polyphenolics and other natural plant nutrients. The polyphenolics, also called flavanols, have a high oxygen radical absorbance capacity (ORAC). The antioxidants found in cocoa have been linked to certain hallmarks of good cardiovascular health such as enhanced blood flow, healthy cholesterol levels and, in some cases, reduced blood pressure. In fact, two tablespoons of natural cocoa have more antioxidant capacity than three cups of green tea, a half cup of blueberries or a glass of red wine.

However, the high level of polyphenols also contributes to a highly bitter taste. As a result, high loading of cocoa powder in foods to obtain maximum benefits of the antioxidants from the cocoa is generally limited in order to make those foods more palatable. High levels of cocoa powder also generally necessitate changes to product formulation and introduces processing difficulties, causing significant losses in antioxidant levels as a result of the processing.

A method and product are desired to deliver high levels of cocoa antioxidant with minimal undesirable modification of the taste, formulation or process of the food product containing the cocoa.

SUMMARY

Exemplary embodiments are directed to concentrated cocoa powder nuggets and methods of making such nuggets that can be used as an ingredient such as an inclusion or a topping for food products in order to increase antioxidant levels. The nugget is manufactured by creating a dough followed by forming the dough into nuggets by methods such as rotary moulding, sheeting and cutting, or cold extrusion. In some cases, the nuggets may then be baked or dried to remove excess moisture and obtain desired texture and shelf life. The nuggets can be crunchy or chewy.

In one embodiment, a method for creating a cocoa nugget comprises providing a dough including, on a dry basis, at least 30% by weight cocoa powder, the dough having a moisture content of at least 10% to about 52% by weight; and processing the dough into nuggets having a moisture content of not greater than about 15% by weight.

In another embodiment, a method for creating a chewy cocoa nugget comprises providing a dough including on a dry basis, at least 50% by weight non-alkalized cocoa powder, the dough having a moisture content of at least 15% by weight, the dough further including about 20% to 45% by weight of a binding agent; and processing the dough into nuggets having a moisture content in the range of about 10% to about 15% by weight and a water activity not greater than 0.6, wherein the nuggets exhibit a loss of oxygen radical absorbance capacity (ORAC) of less than 5% compared to the provided dough.

In yet another embodiment, a method for creating a crunchy cocoa nugget comprises providing a dough including, on a dry basis, at least 50% by weight cocoa powder, and, on a dry basis, less than 20% by weight sweetener, the dough having a moisture content of at least 35% by weight; forming the dough into nuggets; and baking the nuggets to dry to a nugget moisture content of not greater than about 6% by weight, wherein the baked nuggets exhibit a loss of ORAC of less than 5% compared to the provided dough.

Among the advantages of exemplary embodiments is that a cocoa nugget can be formed as an ingredient that has a high retention of cocoa antioxidants during and after processing, can have low or no sugar content, can include other nutrients such as proteins, minerals, and can be controlled to provide shelf stable products of either a crunchy or chewy texture.

Other features and advantages of the present invention will be apparent from the following more detailed description of exemplary embodiments, which illustrate, by way of example, the principles of the invention.

DETAILED DESCRIPTION OF EXEMPLARY EMBODIMENTS

According to exemplary embodiments, a cocoa dough is formed from a mixture containing cocoa powder in the presence of water and/or liquid binders. The dough is then formed into small pieces, referred to herein as nuggets. In some cases, the nuggets may be dried by baking or other methods to remove excess moisture. In other cases, the moisture content may already be low enough upon nugget formation such that a further reduction of moisture content is not needed. The moisture content of the dough is at least about 10% by weight or above, while the moisture content of the finished nuggets is about 15% by weight or less. However, it will be appreciated that the moisture content of the finished nuggets is not greater than the moisture content of the formed dough used to produce the nuggets.

On a dry basis, the mixture used to form the nuggets is about 30% or greater by weight cocoa powder, typically about 50% or greater by weight cocoa powder, more typically about 65% or greater by weight cocoa powder, and in some embodiments about 70% or greater by weight cocoa powder. On an "as is" or wet basis, the cocoa powder may be about 20% to about 60% of the total dough weight prior to nugget formation. The cocoa powder is preferably natural cocoa powder or minimally processed cocoa powder that still has high levels of antioxidants. While alkalized cocoa powder may also be used, the alkalization process reduces the antioxidant content in cocoa powder. The cocoa powder is preferably introduced into the mixture directly as dried cocoa powder, rather than as chocolate liquor, although the use of small amounts of chocolate liquor is not precluded, as long as dough formation is not adversely affected. Furthermore, the use of cocoa liquor introduces fat and reduces the amount of cocoa solids present, lowering the antioxidant level.

The dry mixture may consist solely of cocoa powder. Optionally, sugar or other sweeteners may be added. If a sweetener is added, the mixture generally contains less than about 35% by weight of sweetener, on a dry basis. Some embodiments may be about 25% or less by weight (dry basis)

sweetener, and in other cases, about 10% or less. Higher amounts of sweetener are not precluded. However, the higher the loading of sweetener, the lower the relative amount of cocoa in the dough, and the lower the load of antioxidant level. Also, high levels of sweetener can also result in cocoa nuggets having a glassy, crunchy texture that is too hard.

The sweetener typically, but not necessarily, includes sugar. Other natural and artificial sweeteners may be used in addition to or in lieu of sugar, including sorbitol, mannitol, xylitol, isomalt, lactitol, Stevia, Luo Han Guo, corn syrup, and combinations thereof, all by way of example only.

In order to form a dough, water or other aqueous liquid may be added to achieve an overall moisture content in the dough of about 10% of the total dough weight, up to about 52% of the total dough weight. In some embodiments the dough has a moisture content in the range of about 15% to about 40% by weight. In other embodiments, the dough has a moisture content in the range of about 20% to about 35% by weight. In embodiments in which crunchy nuggets are to be produced, the moisture content of the dough is typically about 30% to about 40%, while in embodiments in which chewy nuggets are to be produced, the moisture content of the dough is typically about 10% to about 20%.

In some embodiments, the moisture content may be achieved through the use of liquid sweeteners, such as aqueous solutions of sugar or other sweeteners. In other cases, to achieve the desired moisture level, water may be added directly to the mixture. It will thus be appreciated that the term "moisture" is particularly intended to refer herein to water content and that the contribution to the dough weight encompasses both water in its ordinary form as well as the water present in aqueous solutions, such as sorbitol solutions, corn syrup, and the like.

Other suitable food additives may also be added to the mixture to form the dough. Such additives include natural and/or artificial flavors such as vanillin and the like, by way of example, as well as emulsifiers such as lecithin, again by way of example only. The presence of emulsifiers may reduce the stickiness of the dough and aid in subsequent processing steps. In some embodiments, such as those in which a chewy nugget is produced, it may also be desirable to add small amounts of anti-caking agent to prevent lumping of the subsequently produced cocoa nuggets during storage. Flavorings, emulsifiers and anti-caking agents, if present, may each be up to about 5% by weight of the total dough weight prior to nugget formation.

The dough may also include binding agents such as maltodextrin, corn syrups, modified starches, gums, glycerin, sorbitol solution and combinations thereof In some embodiments, maltodextrin may be used to replace up to about half of the sweetener content. The total amount of binding agents in the dough may be up to about 45% by weight of the total dough weight prior to nugget formation, depending upon the texture sought to be achieved, as well as the amount of cocoa powder and other sweeteners used. Like the use of sweeteners, however, higher amounts of binding agents can reduce the relative amount of cocoa powder and therefore lower the antioxidant level in finished nuggets. Binding agents are primarily used in embodiments in which the cocoa nuggets are produced to have a chewy texture.

The cocoa nuggets may be produced to have either a crunchy or chewy texture. The amount and type of binding agents may depend on the texture sought to be achieved. For embodiments having a chewy texture, higher amounts of binding agents such as glycerin, sorbitol, and/or corn syrups may be used in amounts from about 20% to about 45% by weight of the total dough weight prior to nugget formation. Crunchy nuggets are typically formulated with little or no binding agents during dough formation.

Embodiments may further include other nutrients as additional additives. For example, protein powders, fiber, vitamins, minerals and combinations thereof may all be incorporated into the mixture. Loading of nutrients may be an amount up to about 20% by weight of the total dough weight prior to nugget formation, although higher amounts are not precluded.

In some embodiments, the dough may be formed by mixing the ingredients for a short period of time in the presence of water to form a cohesive dough, which can be accomplished at ambient temperature. For example, the dough may be formed in less than ten minutes or from about five minutes to ten minutes. In embodiments in which an emulsifier is used, the emulsifier may be added after a dough has been achieved with the other ingredients, followed by additional mixing in the presence of the emulsifier.

It will be appreciated that the dough formed in accordance with exemplary embodiments to create cocoa nuggets is readily differentiable from a common cookie dough, in which flour, flour and added fats make up a major portion of the dough. Dough used to form cocoa nuggets in accordance with exemplary embodiments preferably exclude the presence of added fats or flour, which are at most minor constituents in the dough compared to the cocoa powder.

In other embodiments, the dough can be provided through a multi-step mixing process in which sweeteners such as corn syrup and/or solutions of sugar or other sweeteners are heated to reduce moisture content, dissolve solid sugar and thicken the liquid, followed by the addition of cocoa powder. If glycerin is used, it may be added as a separate step intermediate the heating and the addition of the cocoa powder, which can provide better sugar dissolution.

After a cohesive dough has been formed, nuggets are created by shaping the dough into small pieces suitable for use as inclusions or toppings in subsequent food manufacture. The nuggets can be of any size and shape desired, which may depend in part on the method by which they are made. Generally, the nuggets may be formed by rotary moulding, sheeting and cutting, or cold extrusion. For example, nuggets formed by sheeting and cutting may tend to be regular in shape and appearance and generally flat, while nuggets formed by cold extrusion may be more cylindrical. Because the nuggets are primarily intended for use as an ingredient in food products, the size of the nuggets are such that they generally have a largest dimension of about 10 mm or less, typically about 5 mm or less, and in some cases as small as about 2 mm.

If sugar is used, dough and nugget formation preferably occurs below the melting temperature of sugar, so that the presence of melted sugar does not adversely affect nugget characteristics. In particular, the use of high levels of melted sugar (e.g. >20% by weight) at low moisture content (e.g. ≤2.5% wt. added water) and high temperatures (e.g. 140° C.), to bind the cocoa powder and other ingredients together is avoided. High temperatures at or above sugar's melting temperature can increase antioxidant losses during processing. Furthermore, when high amounts of melted sugar cools, sugar glass is formed in the nuggets, resulting in an extremely hard, glassy texture.

The dough may be dried after nugget formation to reduce the moisture content to a predetermined level to achieve the desired nugget texture, as well as desired water activity for shelf life. Although the drying may be carried out at low temperatures, drying is preferably accomplished by high temperature baking, particularly where nuggets having a crunchy texture is desired. The temperature and time for baking may be adjusted depending upon the texture desired to be achieved and to minimize loss of cocoa antioxidants. Short times and high temperatures are generally preferred, although actual times and temperatures may depend on the difference in moisture content desired to be achieved in the drying process. In some cases, this is accomplished by baking at around 350° F. for five to ten minutes. In other embodiments, the nuggets can be baked at about 390° F. to about 430° F. for about 1.2 to about 2 minutes.

Crunchy nuggets can be produced by reducing the moisture content to about 6% by weight or less, typically about 4% by weight or less. Chewy nuggets generally employ a binding agent and have a moisture content in the range of about 10% to about 15% by weight, with a water activity in the range of about 0.60 or below. In some embodiments, chewy nuggets may be formulated to have a moisture content such that baking or other form of drying is not required.

Cocoa nuggets formed in accordance with exemplary embodiments maintain high levels of cocoa antioxidant even after processing. Exemplary embodiments result in a processing loss of antioxidants (as measured by ORAC) of about 10% or less, and in some embodiments exhibit an ORAC loss of less than 5%.

The nuggets can be used as inclusions in foods such as chocolate or other candy bars, granola or other snack bars, dairy products such as yogurt or ice cream, as well as baked products, such as cookies, brownies, and breads, all by way of example only. Because of the high levels of cocoa loading and the low loss of antioxidant content during processing, the inclusions can be used to enhance the total antioxidant content of such food products. Aside from their use as an inclusion, the nuggets may also be used as a topping or in other food applications. Furthermore, because the nuggets can be manufactured in small sizes, they can provide the enhanced benefits without significantly changing the taste of the products in which they are included.

EXAMPLES

The invention is further described in the context of the following examples, which are presented by way of illustration, not of limitation.

Example 1

A mixture was prepared having the following ingredients in the weight percentages shown, in which natural (i.e. non-alkalized) cocoa powder was present at 69.3% by weight on a dry basis:

| | |
|---|---|
| Natural cocoa powder | 44.4 |
| Sugar | 22.14 |
| Vanillin | 0.04 |
| Stevia | 0.02 |
| Lecithin | 0.1 |
| Water | 33.3 |

All ingredients except the lecithin were weighed in a Hobart bowl and mixed for five to ten minutes to form a cohesive cocoa dough. Lecithin was then added followed by mixing for another two minutes.

The dough was sheeted to a thickness of 3 mm and cut into small disc-like nuggets having a diameter of 4 mm. The nuggets were baked on a baking sheet at 350° F. for five minutes. The baked nuggets had a crunchy texture and were measured to have a moisture content of 3.2% by weight, with a water activity of about 0.40. The nuggets were further analyzed to have an ORAC of 620 µMTE/g. This reflected a loss of only about 3% of the ORAC of the original formulation, which was 955 µMTE/g. The 97% retention of ORAC level reflected that little anti-oxidant loss was experienced in processing.

Example 2

A second mixture was prepared having the following ingredients in the weight percentages shown, including substituting maltodextrin for about half the sugar content used in Example 1:

| | |
|---|---|
| Natural cocoa powder | 44.4 |
| Sugar | 11.03 |
| Maltodextrin (Maltin M180) | 11 |
| Vanillin | 0.07 |
| Stevia | 0.1 |
| Lecithin | 0.1 |
| Water | 33.3 |

Except for the formula change, baked nuggets were otherwise produced in the same manner as described with respect to Example 1. The baked nuggets of Example 2 also had a crunchy texture. They were measured to have a moisture content of 3.5% by weight, with a water activity of 0.42. The nuggets were further analyzed to have an ORAC of 620 µMTE/g. Like Example 1, this reflected a loss of only about 3% of the ORAC of the original formulation, which was 955 µMTE/g. The 97% retention of ORAC level again reflected that little anti-oxidant loss was experienced in processing.

Example 3

A mixture was prepared having the following ingredients in the weight percentages shown, in which the natural (i.e., non-alkalized) cocoa powder was present at 56.0% by weight on a dry basis:

| | |
|---|---|
| Natural cocoa powder | 44.64 |
| Sugar | 8.95 |
| Sorbitol Solution (70% wt) | 12.85 |
| Corn Syrup (62 DE) | 17.23 |
| Glycerin | 4.46 |
| Vanillin | 0.09 |
| Luo Han Guo | 0.71 |
| Lecithin | 0.36 |
| Water | 10.71 |

All ingredients except the lecithin were weighed in a Hobart bowl and mixed for five to ten minutes to form a cohesive cocoa dough. Lecithin was then added followed by mixing for another two minutes.

The dough was sheeted to a thickness of 3 mm and cut into square 5×5 mm nuggets. The nuggets were baked on a baking sheet at 350° F. for eight minutes. The baked nuggets had a chewy texture and were measured to have a moisture content of 10.2% by weight, with a water activity of 0.58. The pieces were further analyzed to have an ORAC of 500 µMTE/g, which reflected almost no loss compared to the formulated value.

Example 4

A mixture was prepared in three stages having the following ingredients in the weights (in grams) shown, in which the natural (i.e., non-alkalized) cocoa powder was present at 54.9% by weight on a dry basis:

| Stage 1 | |
|---|---|
| Sugar | 42 |
| Sorbitol solution (70% wt) | 63 |
| 62 DE Corn Syrup | 84 |
| Water | 21 |
| Stage 2 | |
| Glycerin | 21 |
| Stage 3 | |
| Natural cocoa powder | 200 |

All Stage 1 ingredients were weighed into a small pan and cooked to 237° F. to dissolve the sugar and thicken the liquid. The Stage 2 ingredient was then added and mixed well, followed by adding the Stage 3 ingredient to form a cocoa dough.

The dough was sheeted to a thickness of 3 mm and cut into square 5×5 mm nuggets. The nuggets had a low enough moisture content that further drying was unnecessary after nugget formation, which was already of a chewy texture. The nuggets were measured to have a moisture content of 10.7% by weight, with a water activity of 0.46. The pieces were further analyzed to have an ORAC of 500 μMTE/g, which again reflected almost no loss compared to the formulated value.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for creating a cocoa nugget comprising:
   providing a dough including, on a dry basis, at least 30% by weight cocoa powder, the dough having a moisture content of at least 10% to about 52% by weight; and
   processing the dough into nuggets having a moisture content of not greater than about 15% by weight;
   wherein the step of processing comprises forming the dough into nuggets by cold extrusion, rotary moulding, or sheeting and cutting; and thereafter baking the formed nuggets.

2. The method of claim 1, wherein the step of processing the dough into nuggets comprises processing the dough into chewy nuggets having a moisture content in the range of about 10% to about 15% by weight.

3. The method of claim 1, wherein the step of processing the dough into nuggets comprises processing the dough into crunchy nuggets by drying the nuggets to a moisture content of about 6% or less by weight.

4. The method of claim 1, wherein the dough includes, on a dry basis, at least 50% by weight cocoa powder.

5. The method of claim 1, wherein the step of providing a dough comprises providing a dough having less than about 35% by weight, on a dry basis, sweetener.

6. The method of claim 1, wherein the step of providing a dough comprises providing a dough that includes a binding agent.

7. The method of claim 1, wherein the step of providing a dough comprises providing a dough that includes an emulsifier.

8. The method of claim 1, wherein the step of providing a dough comprises providing a dough that includes an additive selected from the group consisting of protein powder, fibers, vitamins, minerals and combinations thereof.

9. The method of claim 1, wherein the step of providing a dough comprises creating a dough by mixing, on a dry basis, at least 65% by weight cocoa powder with sweetener, water, an emulsifier, and optionally a liquid binding agent.

10. The method of claim 1, wherein the formed nuggets exhibit a loss of oxygen radical absorbance capacity of less than 10% compared to the provided dough.

11. The method of claim 1, wherein the step of providing a dough comprises mixing the cocoa powder in the presence of moisture at ambient temperature.

12. The method of claim 1, wherein the cocoa is non-alkalized cocoa.

13. A method for creating a cocoa nugget comprising:
   providing a dough including, on a dry basis, at least 30% by weight cocoa powder, the dough having a moisture content of at least 10% to about 52% by weight; and
   processing the dough into nuggets having a moisture content of not greater than about 15% by weight;
   wherein the step of processing further comprises baking the nuggets at a temperature of about 350° F. for less than about 15 minutes.

14. A method for creating a cocoa nugget comprising:
   providing a dough including, on a dry basis, at least 30% by weight cocoa powder, the dough having a moisture content of at least 10% to about 52% by weight; and
   processing the dough into nuggets having a moisture content of not greater than about 15% by weight;
   wherein the step of processing further comprises baking the nuggets at a temperature of about 390° F. to about 430° F. for about 1.2 to about 2 minutes.

15. A method for creating a crunchy cocoa nugget comprising:
   providing a dough including, on a dry basis, at least 50% by weight cocoa powder, and, on a dry basis, less than 20% by weight sweetener, the dough having a moisture content of at least 30% by weight;
   forming the dough into nuggets; and
   baking the nuggets to dry to a nugget moisture content of not greater than about 6% by weight, wherein the baked nuggets exhibit a loss of oxygen radical absorbance capacity of less than 5% compared to the provided dough.

16. The method of claim 15, wherein the dough is further provided having at least 65% by weight, on a dry basis, non-alkalized cocoa powder.

* * * * *